July 23, 1957  W. A. BELFRY  2,800,067
COWL VENTILATOR

Filed Jan. 4, 1954  3 Sheets-Sheet 1

INVENTOR
William A. Belfry
BY
Paul Fitzpatrick
ATTORNEY

July 23, 1957

W. A. BELFRY 2,800,067

COWL VENTILATOR

Filed Jan. 4, 1954

INVENTOR
William A. Belfry
BY
Paul Fitzpatrick
ATTORNEY

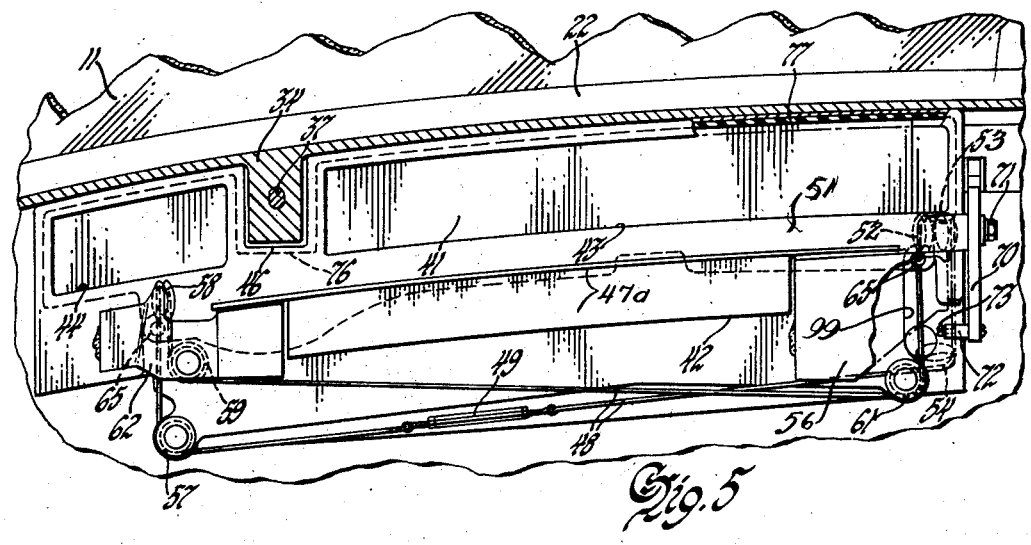

2,800,067
COWL VENTILATOR

William A. Belfry, Rochester, Mich., assignor to General Motors Corporation, Detroit, Mich., a corporation of Delaware Application January 4, 1954, Serial No. 401,966

3 Claims. (Cl. 98—2)

My invention is directed to automobiles, and primarily to improvements in ventilation thereof.

The principal purpose of the invention is to provide ventilation to the occupants of the front seat and particularly to provide fresh air for the front seat passengers at about the chest level. Such ventilation is more adapted to promote the comfort of the passengers than schemes in which air is released into the body at or near the floor level. It is also an object of the invention to provide a structure for this purpose which is particularly simple, convenient, and trouble-free and is attractive in appearance.

The nature of the invention will be more clearly understood from the following detailed description of the preferred embodiment of the invention and the accompanying drawings, in which:

Fig. 5 is an elevation view looking rearwardly, with some parts removed and cut away and certain parts in section, showing the left-hand ventilator; and Fig. 6 is a partial plan view with parts cut away.

Figure 2:
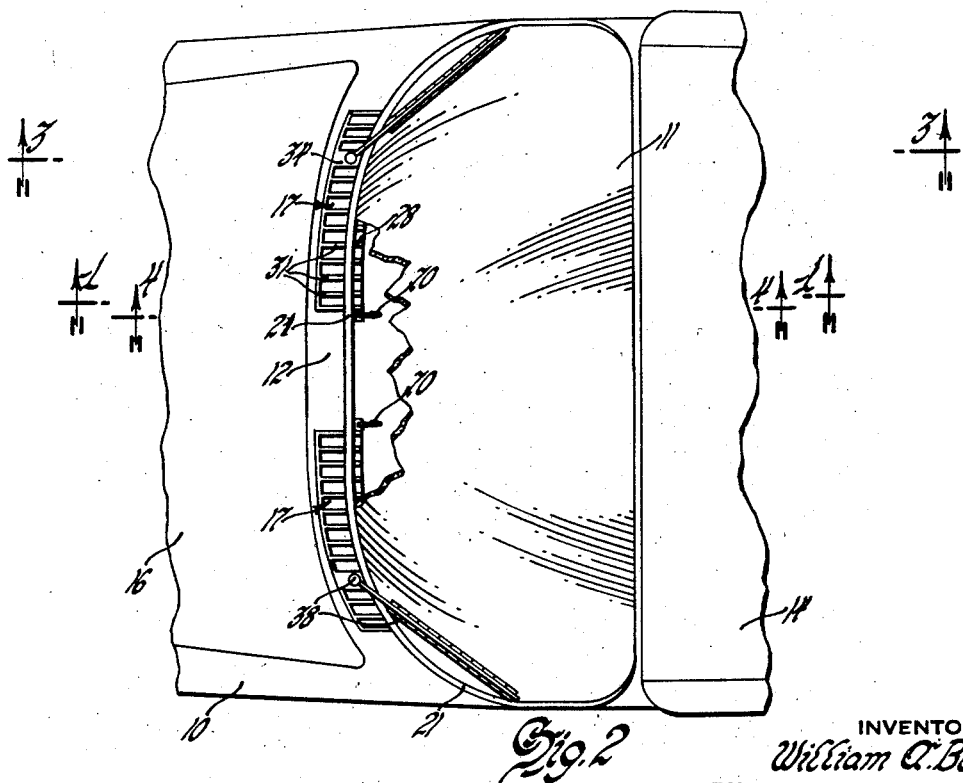
Fig. 2 is a partial plan view of an automobile.

Referring first to Fig. 2, an automobile may include a front body portion or hood 10, a steeply raked windshield 11, a cowl 12, a passenger compartment 14, a hood door 16, and right and left side cowl ventilators 17. An instrument panel or dash 18 which may be covered by a trim pad 19 extends rearwardly of the windshield within the body (Fig. 2). The windshield 11 is mounted in a frame 21 encircling the windshield. Below the windshield in the area of the ventilators 17 the windshield frame is a casting including an upper rail 22 and a lower plate 23. The lower plate 23 extends from the cowl 12 to the dash 18 under the windshield and is supported on a body transverse frame member or cowl bar 24.

It will be noted that each of the ventilators 17 extends approximately a third of the way across the width of the body, defining a rather wide shallow air passage. The lower surface of the air passage is defined forwardly of the windshield by a curved plate or air scoop 26 and rearwardly thereof by a horizontal plate 27, these being mounted on the plate 23. The windshield frame and plates 26 and 27 are fixed to the cowl bar by screws 30 extending through the cowl bar 24 and pads 30a into the plate 23.

Figure 1:
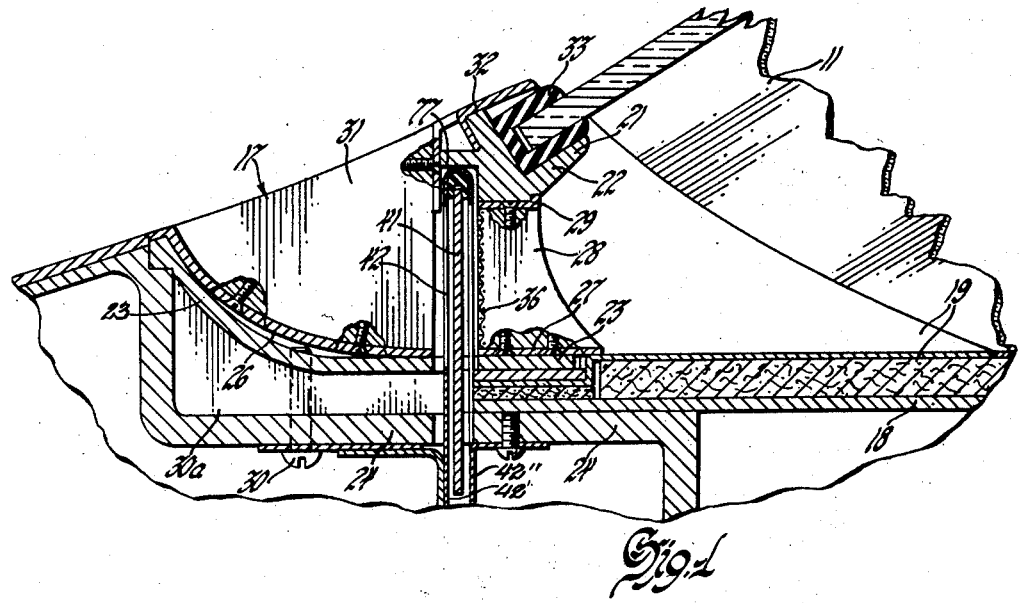
Fig. 1 is a vertical sectional view of a part of the windshield installation of a vehicle taken on a plane parallel to the axis of the vehicle as indicated in Fig. 2.

Vertical fins 28 having an arcuate rear edge extend upwardly from the plate 27 to a strip 29 abutting the under surface of the rail 22. Similarly, fins 31 extend from the air scoop plate 26 to a molding 32 which abuts the forward and upper surfaces of the rail 22 and serves to retain the windshield in the frame, the windshield being mounted in a suitable resilient channel 33. The fins 31 and 28 provide support for the frame member 22 and also serve to form grilles which break up the air passage and improve the appearance thereof. As illustrated, the fins 28 and 31 are held in place by countersunk screws but, it will be apparent, they might be welded or brazed in place, or the entire assembly might be a die-casting. A wire mesh screen 36 is mounted across the forward edges of the fins 28. A thick web or block 34 (Figs. 1 and 3) integral with rail 22 and plate 23 extends between the frame members 22 and 23 at one point on each side of the car, occupying approximately the space required for one ventilating opening between the fins 31. This web extends downwardly to rest against the frame member 24 and has a drilled hole 40 through it for the shaft 37 of a windshield wiper 38. The means by which the wiper shafts 37 are driven is immaterial. The outer face of the web 34 is covered by an extension 39 of the molding 32.

It will be understood that the structure of the ventilator passages outboard of the web 34 is similar to that inboard, previously described.

There is a shutter arrangement at each side by which the ventilating passages are closed comprising a vertically movable shutter plate 41 slidably mounted in a frame 42 which frame comprises front and back plates 42' and 42" respectively closely adjacent each other and welded together at the margin, between which the movable shutter 41 is mounted. The frame is cut away to provide air openings at 43 and 44 (Fig. 5) and is notched downwardly at 46 to clear the windshield wiper mounting.

Figure 4:
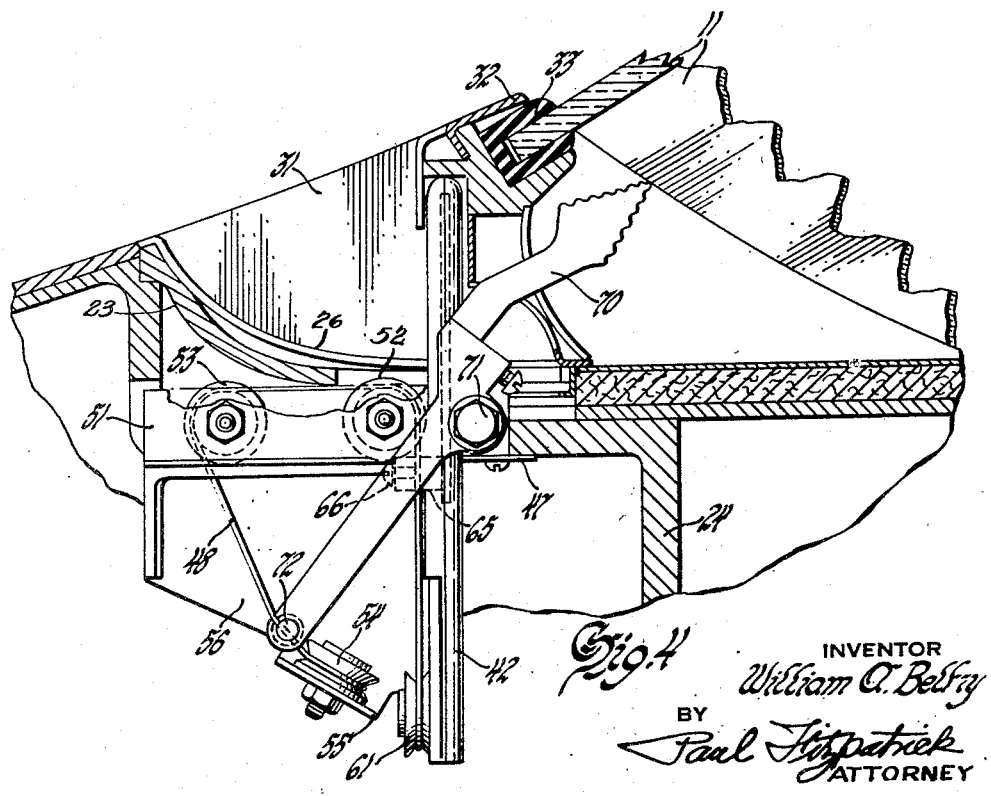
Fig. 4 is a vertical sectional view taken on the plane indicated in Fig. 2.

Tabs 47 bent outwardly from the rear plate of the shutter frame are secured by machine screws to the body transverse frame member 24. An angle iron support 47a fixed to the front plate 42' of frame 42 extends under plate 24 and is retained by screws 30. The shutter 41 is supported in the frame 42 and reciprocated vertically therein by an endless cable arrangement. The endless cable 48, which is tightened by a turnbuckle 49, is mounted on pulleys 52 and 53 rotatably mounted on a bracket 51 extending forwardly from the inboard end of the frame 42. It proceeds from pulley 53 to pulley 54 rotatably mounted on a flange 55 of a plate 56 extending between the frame 42 and the bracket 51. From the pulley 54, the cable 48 extends transversely to a pulley 57 near the other end of the shutter, up over a pulley 58, down over a pulley 59, back across to the inboard end of the frame, around a pulley 61, and up to the pulley 52. Pulleys 57 and 61 are mounted directly on the frame 42 and pulleys 58 and 59 on a bracket 62 welded thereto. The runs of cable between pulleys 61 and 52 at the inboard end and between the pulleys 57 and 58 at the outboard end are coupled to the shutter 41. Two posts or studs 65 (Figs. 4 and 5) extend forwardly from the lower edge of the shutter and have transverse holes through which the cable is threaded. These posts may extend through notches or slots in the plate 42' such as notch 99, Fig. 5. Set screws 66 threaded into the ends of the posts clamp the cable to the shutter. As will be apparent, both ends of the shutter will move in unison as the cable is moved around the pulleys.

A hand lever 70 (Figs. 4, 5, and 6) is provided at each side to move the cable. The lever 70 is pivoted on a bolt 71 mounted on the frame 42 by a rearwardly extending flange of bracket 51. The upper end of the lever is serrated for thumb engagement and the lower end has mounted thereon a post 72 through which the cable extends and is clamped by screw 73.

Figure 3:
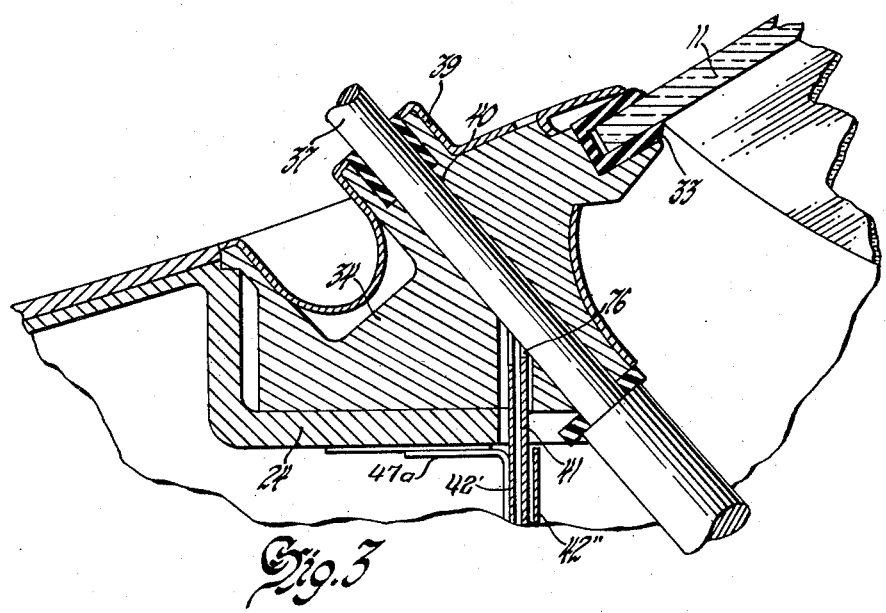
Fig. 3 is a vertical sectional view taken on the plane indicated in Fig. 2.

The upper margin of the shutter is cut away as indicated at 76 in Figs. 3 and 5 to clear the windshield wiper shaft mount.

A weatherstrip 77 of rubber or the like (Fig. 1) is mounted within the upper fold of the frame 42 so that the shutter seals against it.

The advantages and mode of operation of the device should be apparent from the foregoing description. The device provides an attractive grille harmonizing with the lines of the vehicle and provides an ample opening for ventilation on each side of the body. These openings may be readily closed by moving the shutter upwardly by the hand lever 70 on each side or may be opened wide for ventilation. The air will be directed approximately at the chest or face level of the front seat passengers to provide the maximum most comfort.

The description herein, for the purpose of defining the principles of the invention, of the preferred embodiment thereof is not to be regarded as limiting the scope of the invention, since many modifications may be made by the exercise of mere skill in the art.

I claim:

1. In a vehicle, a cowl, a windshield thereon, means for mounting the windshield on the cowl comprising a lower windshield frame interposed between the cowl and windshield, the frame defining a ventilating passage extending from ahead of the windshield to rearwardly of the windshield and extending across a substantial portion of the width of the windshield, means within the passage for mounting a windshield wiper shaft, and means for opening and closing the passage comprising a vertically movable shutter having a notch for clearance of the said mounting means.

2. In a vehicle, a cowl, a windshield thereon, means for mounting the windshield on the cowl comprising a lower windshield frame interposed between the cowl and windshield, the frame defining a ventilating passage extending from ahead of the windshield to rearwardly of the windshield and extending across a substantial portion of the width of the windshield, means within the passage for mounting a windshield wiper shaft, and means for opening and closing the passage comprising a vertically movable shutter, an endless cable connected to the ends of the shutter so as to move the ends concurrently upon movement of the cable, and means for moving the cable.

3. In an automotive vehicle, a cowl, a windshield, means interposed between the cowl and the windshield defining a ventilating opening extending across a substantial part of the width of the windshield, a block in the opening, a windshield wiper shaft mounted in the block, and a shutter movable to open and close the passage, the shutter being cut away to accommodate movement thereof on each side of the block.

References Cited in the file of this patent

UNITED STATES PATENTS

| | | |
|---|---|---|
| 970,526 | Mawdsley | Sept. 20, 1910 |
| 1,198,138 | Lovell | Sept. 12, 1916 |
| 1,289,753 | Haydon | Dec. 31, 1918 |
| 1,670,090 | Achen | May 15, 1928 |
| 1,780,903 | Berman | Nov. 11, 1930 |
| 1,916,907 | Sargent | July 4, 1933 |
| 2,274,690 | Hanson | Mar. 3, 1942 |

FOREIGN PATENTS

| | | |
|---|---|---|
| 134,058 | Australia | Aug. 30, 1949 |
| 491,917 | Canada | Apr. 7, 1953 |
| 977,324 | France | Mar. 30, 1951 |